United States Patent Office 2,955,104
Patented Oct. 4, 1960

2,955,104

PROCESS FOR CURING FLUOROELASTOMERS

John F. Smith, Wilmington, Del., assignor to E. I. du Pont de Nemours and Company, Wilmington, Del., a corporation of Delaware No Drawing. Filed Sept. 17, 1958, Ser. No. 761,487

3 Claims. (Cl. 260—87.7)

This invention is directed to a novel process for curing certain fluoro-elastomers with selected sulfenamides and to the product so obtained. In particular, the novel process of this invention deals with a curing process for an elastomer made by copolymerizing vinylidene fluoride with hexafluoropropene, the curing agent being a sulfenamide selected from the group of those having the structure

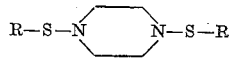

where R is an aromatic or heterocyclic radical.

Fluoroelastomers made by copolymerizing vinylidene fluoride with hexafluoropropene may be cured by ionizing radiation or by chemical means. In the latter case, it has been found necessary to first shape the article into its desired final form by pressure molding and cure it over a relatively long period of time, say 24 to 36 hours. This slow cure is necessary because of the nature of the elastomer and is required in order to avoid shrinkage and change of shape. It is impractical to hold the formed article in the mold for this long time and what is desired is to be able to give the elastomer a quick preliminary cure of the mold sufficient only for the molded elastomer to retain its shape as it is transferred to the final curing oven and given the final cure. Heretofore, the curing agents used for these elastomers were either inactive or too active at the molding temperature. Thus, either the molded article lost its shape or it was scorched, i.e., the cure progressed too fast and resulted in a deformed final product.

It has now been found, according to the present invention, that when one of the described sulfenamides is used to cure these elastomers, a delayed curing action is obtained which enables the elastomer to be properly shaped without scorching and then subjected to a final cure to obtain a useful product.

It is an object of the present invention to effectively cure fluoro-elastomers to give a fully acceptable product. It is a further object of the present invention to effect curing of fluoro-elastomers with a sulfenamide curing agent having the essential activity at a molding temperature utilized. It is still a further object to achieve a delayed curing action which will result in a non-scorched shaped elastomer product. These and other objects will become apparent in the following description and claims.

More specifically, the present invention is directed to a process of curing a fluoro-elastomer prepared by copolymerizing 70 to 30% by weight of vinylidene fluoroide with 30 to 70% by weight of hexafluoropropene, said process comprising the steps of (1) compounding the elastomer with 2 to 5% of its weight with a sulfenamide having the structure

where R is an aromatic hydrocarbon radical or a heterocyclic radical, (2) 5 to 20% magnesium oxide, and, (3) heating the compounded elastomer to a temperature between 150° C. and 260° C. for a time from 1 to 25 hours.

The novel process of the present invention may be carried out by compounding the sulfenamide curing agent with the fluoro-elastomer in the amount desired and the compounded elastomer then shaped in a mold, heated to 150° to 260° C. for at least one hour, removed from the mold and the cure is completed in an oven at this temperature for a period of time between 1 and 24 hours. The amount of the sulfenamide curing agent used will be between 2 and 5% by weight of the elastomer. When less than this amount is used, it is found that there is insufficient sulfenamide present to give an adequate cure; that is, the final elastomer will not have good physical properties. More than 5% will give overcured products having short elongation, high hardness, and other unacceptable properties.

It will be understood, of course, that in compounding the elastomer, other agents may be added as for example: filling agents, coloring materials, extenders and the like.

As indicated, the fluoro-elastomers which are cured by the sulfenamides of this invention are copolymers of vinylidene fluoride with hexafluoropropene and are fully disclosed in Industrial and Engineering Chemistry, October 1957.

The sulfenamide curing agents which may be used in this process are those having the structure derived from piperazine as follows:

where R is an aromatic hydrocarbon radical or a heterocyclic radical.

These compounds are easily prepared by reacting piperazine with the appropriate sulfenyl halide. The sulfenyl halide, preferably chloride, is prepared by reacting chlorine with the appropriate thiol or with the corresponding disulfiide. Examples of compounds useful as the curing agents for this invention are those obtained by reacting piperazine with sulfenyl chlorides, such as phenyl sulfenyl chloride, xylyl sulfenyl chloride, 1-naphthyl sulfenyl chloride, 2-naphthyl sulfenyl chloride, 4-benzylphenyl sulfenyl chloride, benzothiazolyl-2-sulfenyl chloride, 6-methoxy benzothiazolyl-2-sulfenyl chloride, etc.

A temperature of 150° C. to 260° C. is effective in the process of the present invention; below 150° C. an acceptable cure is not effected and temperatures above about 260° C. are unnecessary and uneconomical in practice. As to the cure temperature time of from 1 to 25 hours, a time period below 1 hour does not result in an acceptable cure and the 25-hour time period represents a practical upper time limit to achieve a fully acceptable cured polymer product.

Representative examples illustrating the present invention are as follows:

*Example 1*

A suspension of 33.4 grams of 2-mercaptobenzothiazole in 300 cc. of carbon tetrachloride was refluxed and chlorine passed through the refluxing suspension until a clear solution was obtained. Then 16.8 parts of piperazine in 100 parts pyridine was added. After agitating for an hour the precipitated solid was filtered off, washed with methanol and crystallized from benzene. It was a white compound which melted at 197–198° C. and analyzed correctly for $C_{18}H_{16}N_4S_4$ which corresponds to the structure

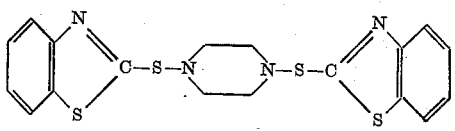

which may be called N,N'-piperazine-bis-2-thiobenzothiazole.

150 parts of a copolymer of 60% by weight vinylidene fluoride and 40% by weight hexafluoropropene was compounded with 23 parts of magnesium oxide, 27 parts of medium thermal carbon black and 4 parts of N,N'-piperazine-bis-2-thiobenzothiazole. Mooney scorch tests on the compounded elastomer carried out at 120° C. showed no rise in viscosity even after 45 minutes.

The compounded elastomer was pressed at 260° C. for 1 hour, removed from the mold and then oven cured at 200° C. for 24 hours. The final cured polymer that was obtained had the following physical properties:

Tensile strength at break _____ lb./in.² __ 2050
Elongation at break _____ percent __ 300
Modulus at 100% elongation _____ lb./in.² __ 470

Example 2

A solution of 16.2 parts of benzene sulfenyl chloride in 100 cc. of pyridine was agitated while 4.8 parts of piperazine in 50 cc. of pyridine was added. After 1 hour agitation the mixture was poured into water and the pale yellow precipitate filtered and recrystallized from benzene. The product was white and melted at 162–163°. Analysis for $C_{16}H_{18}S_2N_2$ confirmed that it was N,N'-piperazine-bis-thiobenzene and had the structure

As in Example 1, 150 parts of the fluoroelastomer was compounded with 23 parts of magnesium oxide, 27 parts of medium thermal carbon black and 4 parts of N,N'-piperazine-bis-thiobenzene. No rise in Mooney viscosity was observed when the scorch tests were carried out at 121° C. for 45 minutes. After pressing at 260° F. for 1 hour removing the mold and then oven curing at 204° F. for 24 hours, the final cured polymer had the following properties:

Tensile strength at break _____ lb./in.² __ 2250
Elongation at break _____ percent __ 290
Modulus at 100% elongation _____ lb./in.² __ 660

Example III 100 parts of a fluoroelastomer containing 60 parts by weight of vinylidene fluoride and 40 parts by weight of hexafluoropropene were compounded on a rubber roll mill with 15 parts of magnesium oxide, 18 parts of medium thermal carbon black, and 3 parts of N,N'-piperazine-bis-2-benzothiazole. Scorch tests carried out at 121° C. showed no rise in Mooney viscosity in 45 minutes.

Portions of the above compounded stock were put in molds and press-cured at the temperatures shown in the table below for 1 hour and then removed from the molds and placed in an oven at 204° C. for 24 hours to complete the cure. The resulting cured elastomers showed the following properties:

|  | A | B | C | D |
|---|---|---|---|---|
| Press temperature, ° C. | 150 | 175 | 204 | 225 |
| Tensile strength at break, Lbs./sq. in. | 1,920 | 2,080 | 2,300 | 2,180 |
| Elongation at break, percent | 400 | 400 | 380 | 300 |
| Modulus at 100% elongation, Lbs./sq. in. | 280 | 330 | 380 | 390 |

In these examples, the tensile strength, elongation and modulus are determined according to ASTM–D–412–51T.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A process of curing a fluoroelastomer prepared by copolymerizing 30 to 70% by weight of vinylidene fluoride with 70 to 30% by weight of hexafluoropropene, said process comprising the steps of (1) compounding said elastomer with from 2 to 5%, by weight, of a sulfenamide having the structure

wherein R is taken from the group consisting of aromatic hydrocarbon radical and heterocyclic radical, (2) 5 to 20%, by weight of magnesium oxide, and (3) heating the compounded elastomer to a temperature within the range of 150° C. and 260° C. for a period of time within the range of 1 to 25 hours.

2. The process of claim 1 wherein the sulfenamide is

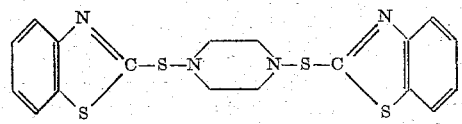

3. The process of claim 1 wherein the sulfenamide is

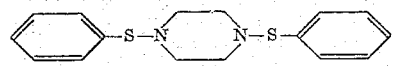

References Cited in the file of this patent

UNITED STATES PATENTS

| 2,514,181 | Smith | July 4, 1950 |
| 2,560,032 | Smith | July 10, 1951 |

FOREIGN PATENTS

| 789,786 | Great Britain | Jan. 29, 1958 |